United States Patent [19]
Müller

[11] Patent Number: 5,978,083
[45] Date of Patent: Nov. 2, 1999

[54] IMAGING AND CHARACTERISATION OF THE FOCAL FIELD OF A LENS BY SPATIAL AUTOCORRELATION

[75] Inventor: Michiel Müller, Amsterdam, Netherlands

[73] Assignee: Stichtng Voor de Technische Wetenschappen, Utrecht, Netherlands

[21] Appl. No.: 08/983,341

[22] PCT Filed: Jun. 28, 1996

[86] PCT No.: PCT/NL96/00267

§ 371 Date: Apr. 16, 1998

§ 102(e) Date: Apr. 16, 1998

[87] PCT Pub. No.: WO97/02477

PCT Pub. Date: Jan. 23, 1997

[30] Foreign Application Priority Data

Jun. 30, 1995 [NL] Netherlands ............................ 1000711

[51] Int. Cl.$^6$ .............................. G01B 9/02; G01N 15/02; G01J 3/30
[52] U.S. Cl. .......................... 356/345; 356/353; 356/336; 356/318
[58] Field of Search .................... 356/345, 353, 356/336, 338, 318, 317

[56] References Cited

U.S. PATENT DOCUMENTS

| | | | |
|---|---|---|---|
| 4,347,000 | 8/1982 | LaCoste | 356/360 |
| 4,818,108 | 4/1989 | Eppinger | 356/360 |
| 5,359,410 | 10/1994 | Diels et al. | 356/345 |
| 5,390,042 | 2/1995 | Ito et al. | 356/345 |
| 5,502,561 | 3/1996 | Hutchins et al. | 356/336 |
| 5,815,262 | 9/1998 | Schrof et al. | 356/318 |

OTHER PUBLICATIONS

"Measurements of Mode Propagation Time in Multimode Fibers Using a Real Time Interferometric Amplitude—Correlator", Journal Of Optical Communications, vol. 13, No. 4, Dec. 1992.

*Primary Examiner*—Frank G. Font
*Assistant Examiner*—Roy M. Punnoose
*Attorney, Agent, or Firm*—Sughrue, Mion, Zinn, Macpeak & Seas, PLLC

[57] ABSTRACT

Method and system for realizing a correlation, at least in space, of the focal fields of at least two electromagnetic beams at the focus of an optical focusing element, wherein a specific spatial distribution in amplitude, phase and polarization of a focal field combined from the focal fields is generated and a physical response to the generated focal field in a sample placed at the focus is measured. A one- or multi-dimensional spatial shift in the focal field of at leat one of the at least two beams is introduced with respect to the focal field of others of the at least two beams. The relative phase of the beams is controlled by a (periodic) variable optical path length for at least one of the beams. The physical response, as a consequence of a physical process in the sample or as a consequence of scattering of the focal field at the sample, is detected, optionally with the aid of a specific collection function which is a combined image of a specific space/time distribution of the physical response at the focus of the focusing element. Microscopic imaging with increased lateral and/or axial resolution is possible when the physical response of a sample subjected to the above-mentioned focal fields is detected by means of a collection function, which may or may not be specific. In addition, the quantitative structure in space and time, related to the point spread function, of the focal field of the focusing element on and alongside the optical axis thereof can be determined in terms of amplitude, phase or polarization.

31 Claims, 5 Drawing Sheets

IMAGING AND CHARACTERISATION OF THE FOCAL FIELD OF A LENS BY SPATIAL AUTOCORRELATION

BACKGROUND OF THE INVENTION

The invention relates to a method and a system for realising a correlation, at least in space, of two or more electromagnetic fields at the focus of an optical focusing element.

It is extremely important for manufacturers and users of optical focusing elements, such as lenses and lens systems, to be able quantitatively to determine the properties of a lens. For manufacturers the point at issue here is both the testing of newly designed products and routine control of the quality of products. For the users of lenses and lens systems for various applications, quantitative data are of importance for the interpretation of measurement data. Currently there are various techniques which can be used to determine the quality of lenses. Virtually all of these techniques can be assigned in two main categories: (i) the determination of the optical transfer function (OTF) [K. R. Barnes. *The optical transfer function* (Adam Hilger, London 1971)]; or (ii) the determination of the point spread function (PSF) [G. J. Brakenhoff, P. Blom and P. Barends. *Confocal scanning light microscopy with high aperture immersion lenses.* J. Microsc. 117, 1979, pp. 219–232].

The principle of all OTF measurement methods is based on the assumption that a lens system can be considered as a linear filter with regard to two-dimensional spatial frequencies in an object when two conditions are met [M. Born and E. Wolf. *Principles of optics* (Pergamon Press, Oxford, 1980)]: (i) isoplanatism, i.e. the wave front aberrations as a consequence of the imaging lens are independent of the position of the object; and (ii) linear superposition, i.e. the total effect on the image point which is produced by one or more objects is given by a linear summation of the individual values at the image point of each of the objects. Under these assumptions, the PSF is related to the OTF by a Fourier transformation.

There are two basic principles from which all OTF measurement methods are derived: (i) scanning methods; and (ii) shear interferometry.

The scanning methods are based on the use of a sinusoidal grating for the selection of a Fourier component of the object to be tested. The grating can be used either in the object or in the image. The limitations of the techniques which are based on this principle are, in general, a consequence of the low photon efficiency which has an adverse effect on the accuracy of the measurement. Moreover, it is frequently not easily possible to determine the transfer function at spatial frequency zero (necessary for normalization of the OTF) and at high spatial frequencies. The necessary assumption of isoplanatism also constitutes a limiting factor in the applicability of these techniques.

The techniques which are based on shear interferometry determine the autocorrelation function of the exit aperture plane of the imaging system. It is possible to derive [J. J. Stamnes. *Waves in focal regions* (IOP Publishing Ltd., Bristol, 1986)] that, in the case of incoherent illumination, the OTF is equal to this autocorrelation function. This also applies, with small modifications, to the case of coherent illumination. Limitations of techniques which are based on shear interferometry are that only the monochromatic OTF can be determined and that, in general, highly complex optical systems are needed.

A limitation of all OTF measurement methods is that they are not capable of determining the response of the system in three dimensions. Such information is, in particular, important for, for example, (confocal) microscopy, which is able to make three-dimensional images with sub-micron resolution.

The point spread function (PSF) also can be determined in various ways. In most cases the methods are based on the—three-dimensional—imaging of a point object with a typical size which is much smaller than the characteristic width of the PSF. The PSF is then either determined in the complete field by means of mathematical reconstruction or is measured directly by scanning through movement of point object or detector. Although these methods are able to determine the PSF with high accuracy, they have the significant disadvantage that they are relatively slow—frequently more than one hour is needed for a single determination—and therefore demand long-term (nanometer) stability of the optical measurement set-up. The slowness of this type of method also makes them impractical for routine alignment or test procedures. Since the optical and electronic measurement set-up for these methods is in general highly complex, it is difficult to make the measurements reproducible. Moreover, these methods frequently demand a specific preparation of the sample, whereby, for example, fluorescent—or scattering—latex beads have to be embedded in a specific medium. The choice of the sample is then limited by the availability of fluorescent beads and the typical refractive index of the embedding medium. Consequently, it is frequently not possible when determining the PSF to simulate the specific experimental conditions, both with respect to the properties of the fluorescent substance and with respect to the refractive index of the solvent.

SUMMARY OF THE INVENTION

The aim of the invention is to solve abovementioned problems and to apply the principle of the invention in the field of (microscopic) imaging and pattern recognition to improve the lateral and axial resolution. The degree of improvement in the resolution can gradually be adjusted and used independently on the lateral and the axial dimensions.

Another aim of the invention is to indicate a method for measuring the characteristic properties of optical focusing elements or lenses which enables "real time" testing and alignment of systems consisting of one or more optical focusing elements.

A further aim of the invention is to determine wave front aberrations induced by an optical focusing element and/or by external factors and, on the basis of these data, to achieve (inter)active control of wave fronts.

This is achieved according to the invention with the aid of a method for realising a correlation, at least in space, of the focal fields of at least two electromagnetic beams at the focus of an optical focusing element, which method comprises the steps of generation of a specific spatial distribution in amplitude, phase and polarisation of a focal field, combined from the focal fields, at the focus, and measurement of a physical response to the generated field in a sample placed at the focus. In a further embodiment, the method also comprises the step of generation of a distribution, in time, of the said amplitude, phase and polarisation of the combined focal field.

In the abovementioned method a spatial autocorrelation technique is used, optionally in combination with a time correlation, for determining a functional response, to be denoted point spread autocorrelation function (PSAF), of an optical focusing element. An optical focusing element is understood to be an arbitrary lens, lens system consisting of a combination of lens elements or a (microscopic) imaging system.

According to the invention, this is also achieved with the aid of a system for carrying out the abovementioned method, which is provided with at least one electromagnetic source for generating at least one electromagnetic beam, a mechanism for splitting the at least one electromagnetic beam into at least two part beams and for recombining them, an optical focusing element for focusing the part beams, a mechanism for introducing at least one relative one- or multi-dimensional spatial shift of the focus of at least one of the part beams with respect to the foci of the other part beams, and at least one detector, which system is characterised in that a sample is placed beyond the optical focusing element such that the focus of the part beams is formed therein and the combined focal field generates a physical response therein related to at least one from the group comprising amplitude, phase and polarisation of said focal field, and in that the at least one detector for measurement of the physical response is positioned outside said focus.

For the determination of the PSAF of an optical focusing element, an incoming electromagnetic beam—of arbitrary wavelength and generated by an arbitrary light source (anything, varying from a discharge lamp, a CW laser or a femtosecond pulsed laser system)—is split into two controlled parts. The two parts of the incoming electromagnetic beam are denoted "reference" and "object" beam respectively. The object beam passes a variable delay line before it is combined with the reference beam. The variable delay line can be used to control the relative time coincidence or simultaneity of the two beams after recombination. The two beams are combined in a suitable manner (for example collinearly in the preferred embodiment) and focused in a sample by the optical focusing element under test. Orthogonal (for example "theta" [E. H. K. Stelzer and S. Lindek. *Fundamental reduction of the observation volume in far-field light microscopy by detection orthogonal to the illumination axis: confocal theta microscopy*. J. Microsc. 111, 1994, pp. 536–547]) illumination conditions can be used for the determination of asymmetries in the PSAF in the axial direction. In the mode of application described here, the sample consists of a solution of one or other fluorescent substance, having an absorption spectrum matching the wavelength of the incoming electromagnetic field. Samples of a different structure can likewise be used, such as, for example, fluorescent spheres having a radius significantly smaller than the typical dimensions of the focal field of the focusing element, thin fluorescent layers, or samples having a more complex structure.

The three-dimensional structure of the electromagnetic field at the focus of the optical focusing element, defined by amplitude, phase and polarisation, is determined by correlating the focal field with itself. This autocorrelation is realised by inducing a spatial shift of the focus of the object field (to be denoted as "focal object field") with respect to the focus of the reference field (to be denoted as the "focal reference field") and measuring the combined field at the focus of the optical focusing element (to be denoted as the "total focal field").

The measurement is carried out when the complex quantity of the field is converted into an actual quantity. This can be effected by an arbitrary physical process (one-, two- or multi-photon absorption followed by fluorescence, four-wave mixing, etc.) or by detection of the scattered electromagnetic field. In both cases, the physical response is detected by a specific collection function and consists of one or more electromagnetic fields propagating from the sample. Said collection function can be formed specifically by making use of either a direct image on one detector or a combination of detectors, so that a collection function is produced which is an image of a specific space/time distribution of the physical quantity at the focus of the optical focusing element which quantity is to be measured. Moreover, in the detection use can be made—in the same way as used to create a specific space/time distribution in amplitude, phase and polarisation in the focal field—of single or multiple splitting and combining, including mechanisms for applying (periodic) phase changes and multi-dimensional spatial shifts, of the physical response (for example a fluorescence beam).

The use of a sample for generating a physical response, such as, for example, by means of an absorption process—or, in the case of scattering, by making use of suitably positioned and analysed detectors—in this case creates a local detector by squaring the (complex) total field in each spatial position. Compared with the conventional approach, in which the squaring of the complex field takes place only at the detector, this application offers the great advantage that the response is related to a local quantity in each spatial position in the focal field of the focusing element, instead of to an integrated value thereof. In other words: instead of the square of the sum, in this invention the sum of the squares is measured.

As a consequence of the various phase jumps over the spatial extent of the focal field as generated by the optical focusing element, a specific interference pattern is produced when the focal object field is shifted over the focal reference field. The basic principle of the measurement of the three-dimensional structure of the focal field of the optical focusing element consists, according to the invention, of the spatial shift of a copy of the focal field, or of a focal field related thereto in a defined manner—either of the same original electromagnetic beam, or of another electromagnetic beam, with respect to the original—on condition that there is a certain degree of isoplanatism (in an appreciably less restrictive form than in the methods for OTF or PSF determination discussed above)—and the use of a physical process as detector which is sensitive to the local field strength at each point in the focal field.

A number of possible basic measurements are included in the present method:

(i) the local electromagnetic field intensity, integrated over the spatial extent of the focus of the optical focusing element, for time coincidence of reference and object field, for various spatial shifts of the object field with respect to the reference field;

(ii) the difference between the maximum and minimum strength of the physical response of the system for various spatial shifts of the object field with respect to the reference field. In this context the physical response, in this form of the basic measurements, consists of the alternating amplitude of the local electromagnetic field intensity, integrated over the spatial extent of the focus of the optical focusing element, as a consequence of positive and negative interference, due to the application of a suitable, varying phase change, for example induced by a varying optical path length, of the object field relative to the reference field;

(iii) the relative phase of the physical response of the system with respect to the phase of an applied phase change for various spatial shifts of the object field relative to the reference field. In this context the physical response, in this form of the basic measurements, consists of the alternating amplitude of the local electromagnetic field intensity, integrated over the spatial extent of the focus of the optical focusing element, as a consequence of positive and negative interference, resulting from the application of a suitable, varying phase change, for example induced by a varying optical path length, of the object field relative to the reference field. The phase of the change is determined by the difference in path length between the object beam and the reference beam with respect to time coincidence; and (iv) the constant part of the physical response of the system for various spatial shifts of the object field relative to the reference field. In this context the physical response, in this form of the basic measurements, consists of the alternating amplitude of the local electromagnetic field intensity, integrated over the spatial extent of the focus of the optical focusing element, as a consequence of positive and negative interference, resulting from the application of a suitable, varying phase change, for example induced by a varying optical path length, of the object field relative to the reference field.

The combined information from the measurement(s) yields—in "real time", according to the invention—a number of parameters which are suitable for the characterisation of the focal field of the optical focusing element, in terms of amplitude, phase and polarisation, in a manner comparable to that which is possible with the aid of the PSF. This applies to the characterisation in all three spatial coordinates. In the basic embodiment of the method, only a simple scanning unit for inducing the spatial focal shift of the object field relative to the reference field and a solution of a suitable fluorescent substance in a medium having the correct refractive index are needed. The speed of the method and the simplicity of the sample preparation make the technique outstandingly suitable for testing and measuring an optical focusing element, for alignment and optimisation of complex imaging systems, for the determination of wave front aberrations induced by the optical focusing element itself, by the medium in which the measurement takes place or by external factors, and for imaging and pattern recognition.

An alternative method for determining a response which provides information relating to the quality of a lens is disclosed in U.S Pat. No. 4,347,000 of F. P. G. Lacoste. In this case an interferometric system is used, consisting of a light source and a beam splitter which splits the light beam into two parts. The lens to be tested is placed in one of the two light paths. The two light beams are reflected and combined again in the same beam splitter before their joint effect is measured with the aid of a photodetector. The reflector in the light path other than that in which the lens is placed is movable, both in the form of a translation along the axis of the light beam and in the form of a rotation perpendicular to said axis. The response detected represents the complex PSF of the lens. The present invention differs from the said patent by making use of (i) a sample which is placed at the focus of the focusing element to be tested so that the conversion of the complex quantity of the field into a real quantity takes place at local level in the sample, instead of at the detector itself; (ii) an autocorrelation of the focal field, instead of a cross-correlation; (iii) different collection functions as a result of which the complete three-dimensional structure of the point spread function of the lens becomes available.

BRIEF DESCRIPTION OF THE DRAWINGS

The invention will be explained in more detail with the aid of a few embodiments with reference to the drawings, in which.

DETAILED DESCRIPTION OF THE INVENTION.

Figure 1:
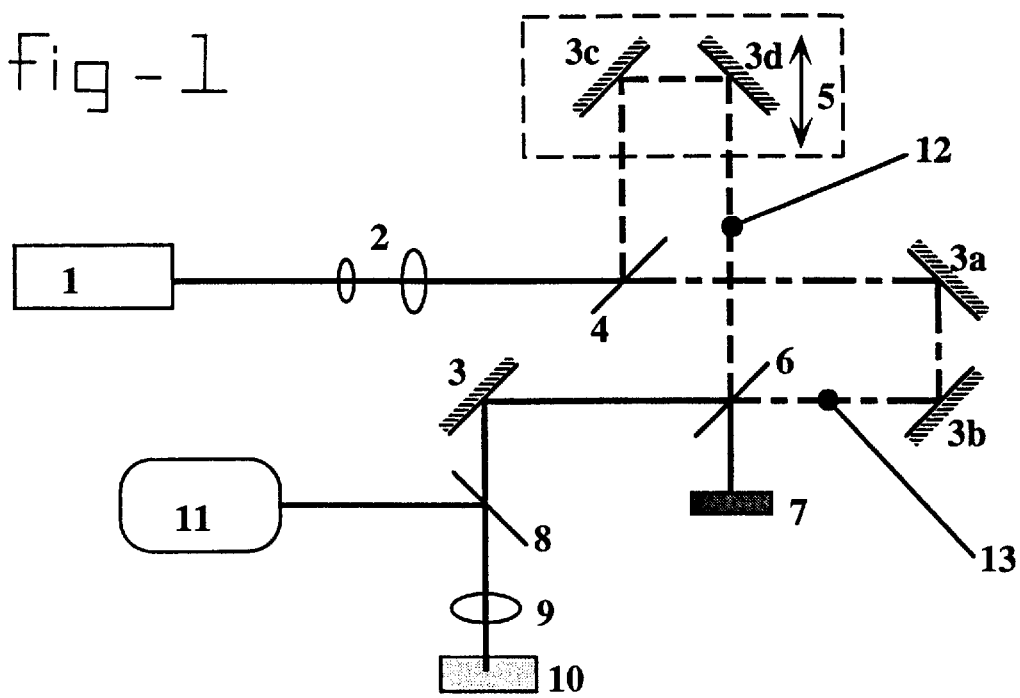
FIG. 1 shows a diagrammatic representation of an embodiment for the determination of the PSAF.

To provide a more detailed description of the procedure or method according to the invention, a diagrammatic representation of a possible embodiment is given in FIG. 1. An electromagnetic beam generated by a low power CW laser 1 first passes through a telescope 2 which ensures that the beam width completely fills the aperture of the optical focusing element 9 and also ensures that a virtually parallel beam is provided. The beam is then split into two parts by a 50% beam splitter 4. One part, the "reference" beam 13, passes two mirrors 3a, 3b, whilst the other part, the "object" beam 12, passes two similar mirrors 3c, 3d which are mounted on a variable delay line 5. The two parts are combined again with the aid of a second beam splitter 6. As a result of the movement of the variable delay line, the path length of the object beam relative to the reference beam changes and the relative time coincidence or simultaneity at the point of combination can therefore be controlled. After combination, one part of the combined beam is collected by a beam stopper 7, whilst the other part is focused in the sample 10 by the optical focusing element 9. The sample consists of a solution of a fluorescent substance in one or other solvent. There are no specific constraints in respect of either the fluorescent substance or the solvent. Both can be chosen such that they best suit the purpose of the measurement. This includes a freedom of choice with regard to the absorption and fluorescence characteristics of the fluorescent substance and a freedom of choice for a solvent having a specific refractive index or for the use of suitable mixtures of solvents. The fluorescence emitted is measured in the backscattered direction by a "photomultiplier tube" detector 11 and is separated from the scattered light at the laser wavelength by means of a dichroic mirror 8.

Figure 2:
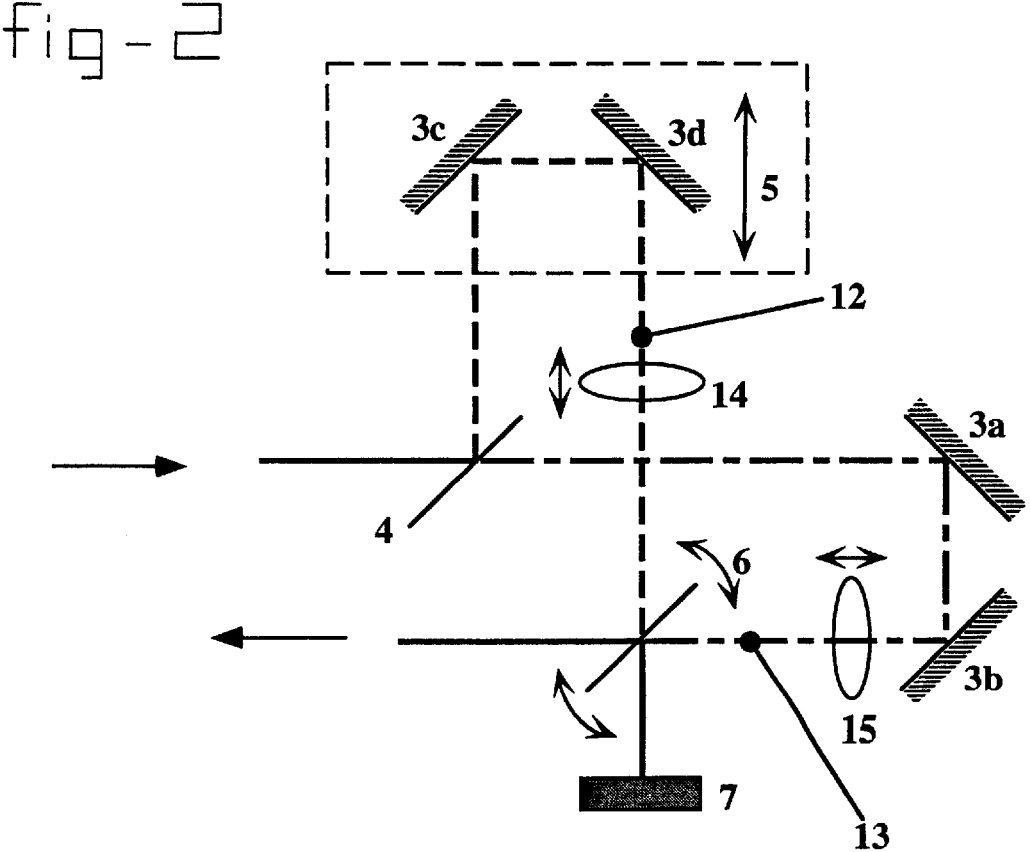
FIG. 2 shows a diagrammatic representation of another embodiment, based on the rotation of a beam splitter and the movement of a lens, by which means a three-dimensional shift of the focal object field with respect to the focal reference field can be realised.
Figure 3:
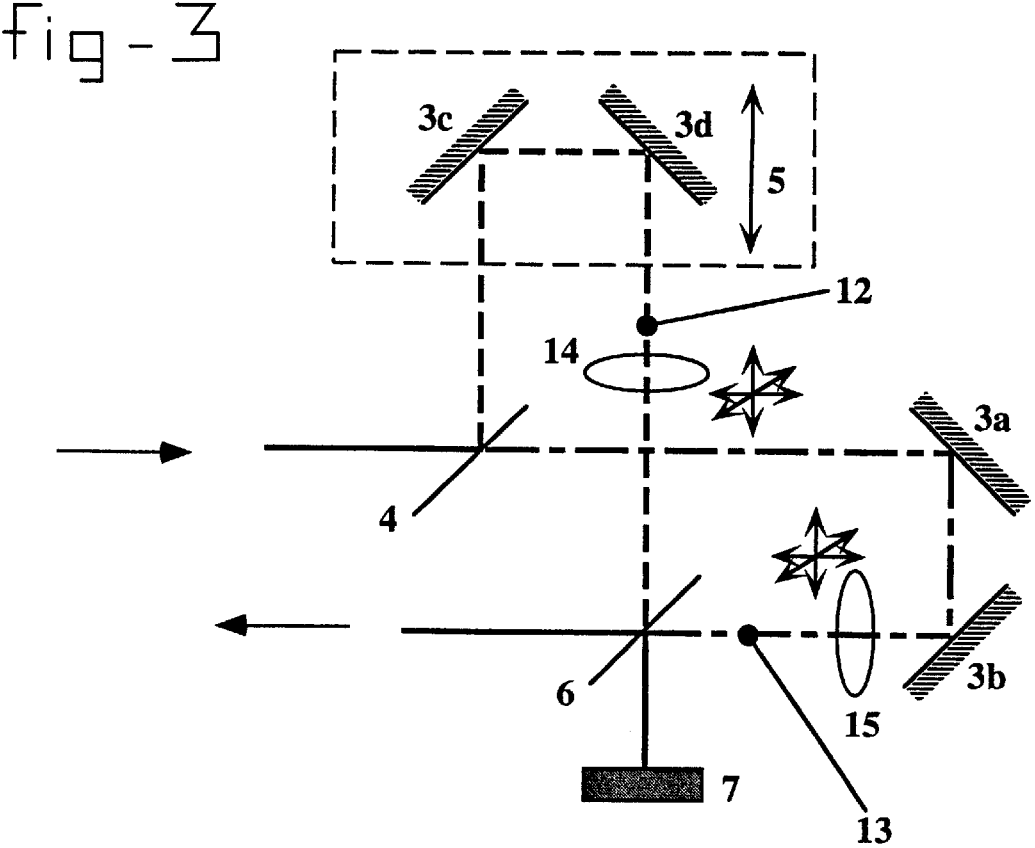
FIG. 3 shows a diagrammatic representation of yet a further embodiment, based on the three-dimensional movement of a lens, by which means a three-dimensional shift of the focal object field with respect to the focal reference field can be realised.

FIGS. 2 and 3 show two further embodiments for introducing a shift in the focal object field relative to the focal reference field.

The method of FIG. 2 makes use of a rotation of the combining beam splitter 6 for introducing a two-dimensional shift of the focal object field relative to the focal reference field in a plane perpendicular to the direction of propagation of both beams. The rotation can be effected by making use of, for example, a motorised stepper motor, a piezo-electronic drive or something similar. By positioning said bundle splitter relative to the aperture of the optical focusing element 9 such that telecentric conditions are met, proper filling of the aperture during shifting of the object beam is maintained. The third dimension is added to the shift of the focal object field relative to the focal reference field by adding two lenses 14, 15, one in the reference beam and one in the object beam. By moving lens 14 in a direction parallel to the direction of propagation, the focal point of the object beam will also be shifted in a direction parallel to the direction of propagation. The method makes use of a lens in both beams in order to ensure identical optical conditions for both beams. The movement of lens 14 can again be effected by making use of, for example, a motorised stepper motor or a piezo-electronic drive. An effect similar to that mentioned above can be achieved by means of a combined—opposing—movement of the lenses 14 and 15, both along the axis of propagation of, respectively, object beam and reference beam.

The three-dimensional shift of the focal object field relative to the focal reference field can be integrated in one translation of lens 14, as indicated in FIG. 3. In this case lens 14 is moved in three dimensions, which results in a corresponding three-dimensional shift of the focal object field relative to the focal reference field. Once again, use can be made of a motorised stepper motor, a piezo-electronic drive or something similar for driving the movement of the lens. Said devices are able to drive the movements of lens 14 or beam splitter 6, as shown in FIGS. 2 and 3, at high speed, which makes rapid data acquisition and measurement in "real time" possible.

More complex methods for applying a specific phase and amplitude distribution, over the aperture of the optical focusing element to be tested, of both the reference beam and the object beam can be used by employing different apodisation conditions by making use of, for example, apertures of different shapes (circular, square, etc.), annuli and/or, more generally, adjustment of the local amplitude, phase and polarisation conditions over the aperture of the optical focusing element, such as, for example, can be achieved using liquid crystal matrices.

After the combined beams have been focused in the sample, the fluorescence—resulting from the induced absorption process and integrated over the spatial extent of the focus—is measured. In this method the absorption process acts as a local "quadrative detector": the local amplitude and phase of the total focal field (reference and object) are converted into a local intensity—the complex square of the electromagnetic field amplitude—the magnitude of which is measured after integration over the space. The simplest implementation of this principle, and that which is discussed in the remainder of this section, comprises the use of single photon absorption and detection of the fluorescence. However, many other optical processes can be used for the same effect, such as saturation absorption, two-photon absorption, multi-photon absorption, four-wave mixing, scattering using a suitably positioned and analysed detector, etc. Use can also be made of so-called "programmed" optical pulses, in which case the frequency/time profile of the pulse is formed in a specific way and use can be made of time-resolved measurements.

In the preferred embodiment, a periodic movement of the variable delay line 5 influences the relative time delay of the object beam relative to the reference beam. As a consequence, a number of alternating constructive and destructive interferences are produced at the level of absorption during each movement of the variable delay line. In turn, this gives rise to variations (i.e. oscillations) in the detected fluorescence signal. The amplitude of these oscillations is related to the degree of overlap, the respective polarisation state, the relative coherence and the phase relation between the two focal fields. The autocorrelation of the focal field is measured by measuring the amplitude of these oscillations as a function of the induced focal shift of the focal object field relative to the focal reference field. The fact that the continuous movement of the variable delay line makes this method relatively insensitive to external influences which change the optical path length of either the reference beam or the object beam, whilst the interferometric information content is retained, is of great value for the application of the method as a "user-friendly" measuring tool for characteristics of optical focusing elements.

Figure 4:
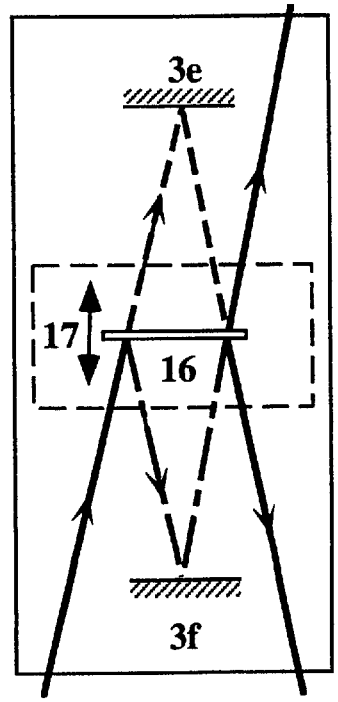
FIG. 4 shows a diagrammatic representation of a simple device for introducing a difference in path length between two electromagnetic beams.

FIG. 4 is a diagrammatic representation of a simple method and device for introducing a variable phase change, for example induced by a varying optical path length, between object beam and reference beam. In this method use is made of only two mirrors 3e, 3f and one beam splitter 16, which is used both for splitting the beam and for combining the beams. After combination, one emergent part of the combined beam is collected by a beam stopper 7, as in the previous figures. As a result of movement of the beam splitter 16, which is mounted on a variable delay line 17, the relative path length changes for the one part of the beam with respect to the other part.

A specific movement of the beam splitter gives rise to a change which is more than four times as large in the relative path length of the two parts of the split beam. The advantage of this approach over the customary techniques for introducing time delays in autocorrelation techniques is that fewer optical elements and smaller movements of the driver for the variable delay line are needed for a given same time delay. The shorter optical paths make a more compact—and inherently more stable—construction possible.

The construction as shown in FIG. 4 can be implemented in an element having dimensions of less than one centimeter. Use can be made of various techniques, as known to those skilled in the art, for driving the variable delay line 17. The system described here, as shown in FIG. 4, is, in addition to being suitable for the application described above, also outstandingly suitable for use in standard autocorrelation techniques for measuring the duration of optical pulses.

Figure 5:
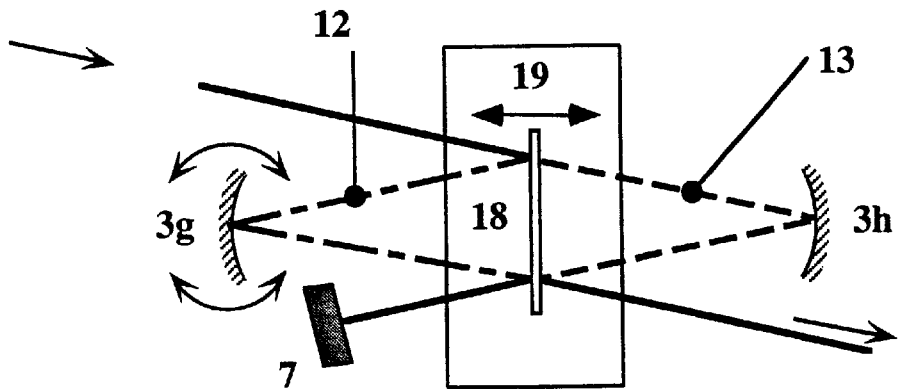
FIG. 5 shows a diagrammatic representation of a combination of the principles shown in the embodiments in FIGS. 2–4, by which means both a three-dimensional shift of the focal object field with respect to the focal reference field and an adjustable difference in path length between the object beam and the reference beam can be realised.

FIG. 5 shows diagrammatically how the various principles as shown in the embodiments in FIGS. 2–4 can be combined to form a single module. The incident beam is split by a beam splitter 18 which is mounted on a variable delay line 19. Both parts of the beam pass mirrors having a specific curvature 3g, 3h, which can be provided with (inter)active elements for inducing changes in shape. The different curvatures provide specific axial positions of the focal fields of the reference beam 13 and the object beam 12 beyond the optical focusing element. The additional lateral shift of the focal object field relative to the focal reference field is achieved by a two-dimensional tilt of one of the two mirrors 3g.

The amplitude of the fluorescence oscillations is measured making use of an electronic band pass filter, matched to the oscillation frequency of the signal, or by means of a lock-in amplifier. Apart from the amplitude of the fluorescence oscillations, a number of other parameters can be measured which are relevant for the method. These are: the constant (non-oscillating) part of the fluorescence signal, the fluorescence intensity at time delay zero (i.e. when the optical path length is the same for reference beam and object beam) and the phase of the oscillating part of the fluorescence with respect to time delay zero. All of these signals can be measured in "real time", as a result of which application of the technique for rapid—and routine—testing of lenses, the alignment of lenses or lens systems and rapid data acquisition in the case of three-dimensional imaging or pattern recognition becomes possible.

Figure 6:
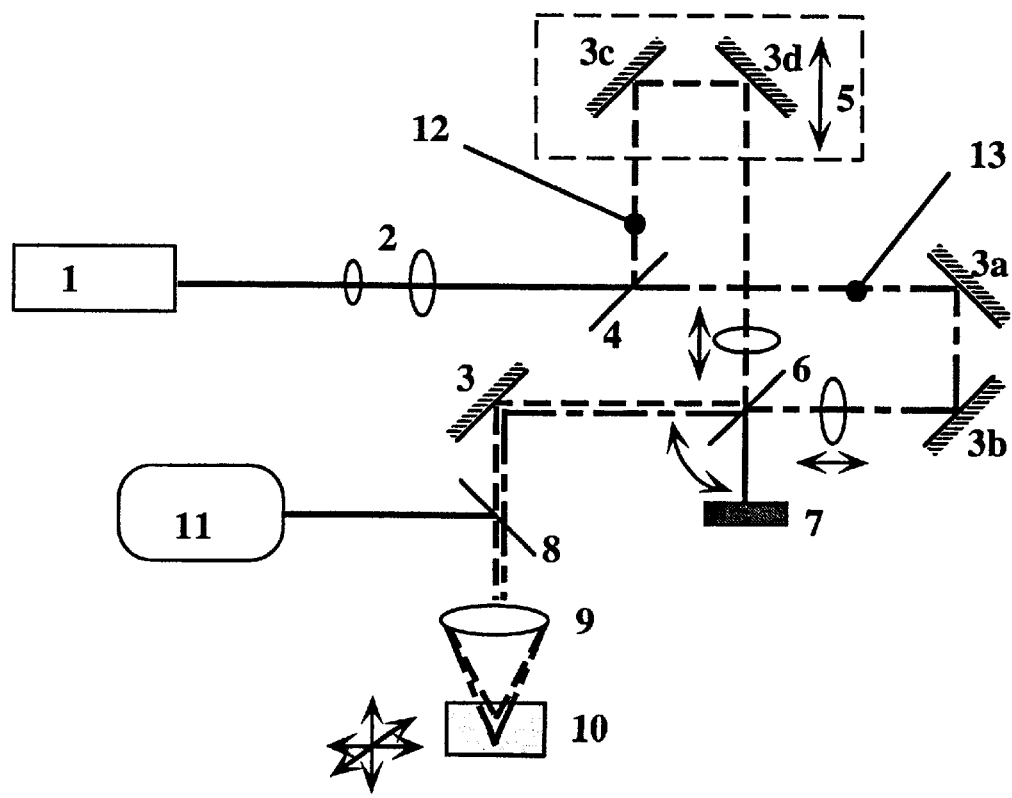
FIG.6 shows a diagrammatic representation of an embodiment for the realisation of three-dimesionsal (microscopic) imaging.

The method described above can advantageously be used for (microscopic) imaging of a sample structured in some manner or other, with increased lateral and/or axial resolution in a manner as indicated diagrammatically in FIG. 6. In this case, the physical response is measured according to one of the basic measurements as described on pages 6 and 7 and as a function of the three-dimensional position of a sample 10 for a specific position of the focal field of the reference beam 13 and that of the object beam 12, obtained in a manner as described, inter alia, with reference to FIGS. 2 and 3. Said measurement can be carried out either by moving the sample relative to the total field or by moving the total field (scanning) relative to the sample. The physical response—for example fluorescence of the sample—can be measured directly by means of a detector, or with the aid of a specific collection function. This procedure can be repeated for different positions of the focal fields of the object beam and reference beam, during which operation different spatial frequencies in the sample can be amplified. The collection function can be produced, for example, by making use of confocal detection [G. J. Brakenhoff, P. Blom and P. Barends. *Confocal scanning Zight microscopy with high aperture immersion lenses*. J. Microsc. 117, 1979, pp. 219–232], the conjugated detection distribution being placed in a specific position with respect to the focal fields of the reference beam and object beam. This method of imaging, which in the limit of coincidence (in space and time) of the focal fields of the object beam and reference beam is equivalent to conventional confocal microscopy, can be employed for the determination of the three-dimensional structure of, for example, biological preparations or samples from the material sciences. More complex collection functions can be produced by making use of several detectors, such that a collection function is obtained which is an image of a specific space/time distribution of the physical quantity at the focus of the focusing element which is to be measured.

The informational content in the various signals can be analysed by making use of theoretical models based on scalar or vectorial diffraction theory, by means of which the focal field of the optical focusing element (or derived parameters which are suitable for the characterisation and optimization of said element) can be calculated under general conditions. Different focusing conditions can then be modelled by calculating the focal field for apertures under different apodisation conditions and for different positions of the geometric focal point behind the aperture, either on or off the optical axis. Phase distortions for both the reference and the object field, or for both fields individually, can be modelled by making use of suitable phase and amplitude functions in these calculations. The polarisation state of each of the fields can be modelled by incorporating the vectorial character of the field in the description.

Figure 7:
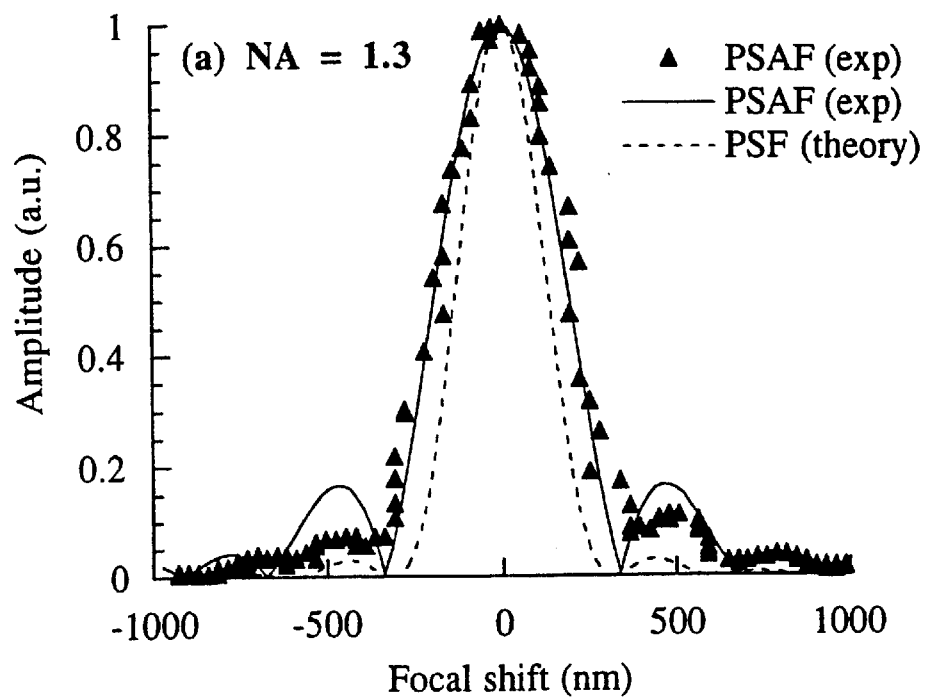
FIGS. 7 to 9 show representations of various experimentally determined PSAFs, compared with theoretically calculated PSAFs and PSFs.
Figure 8:
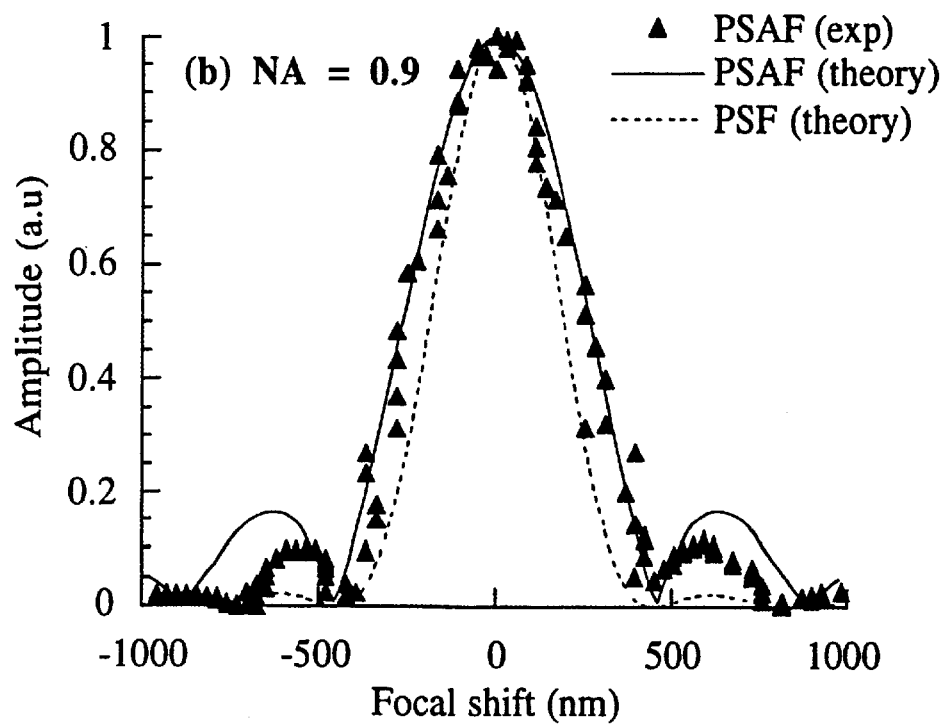
Figure 9:
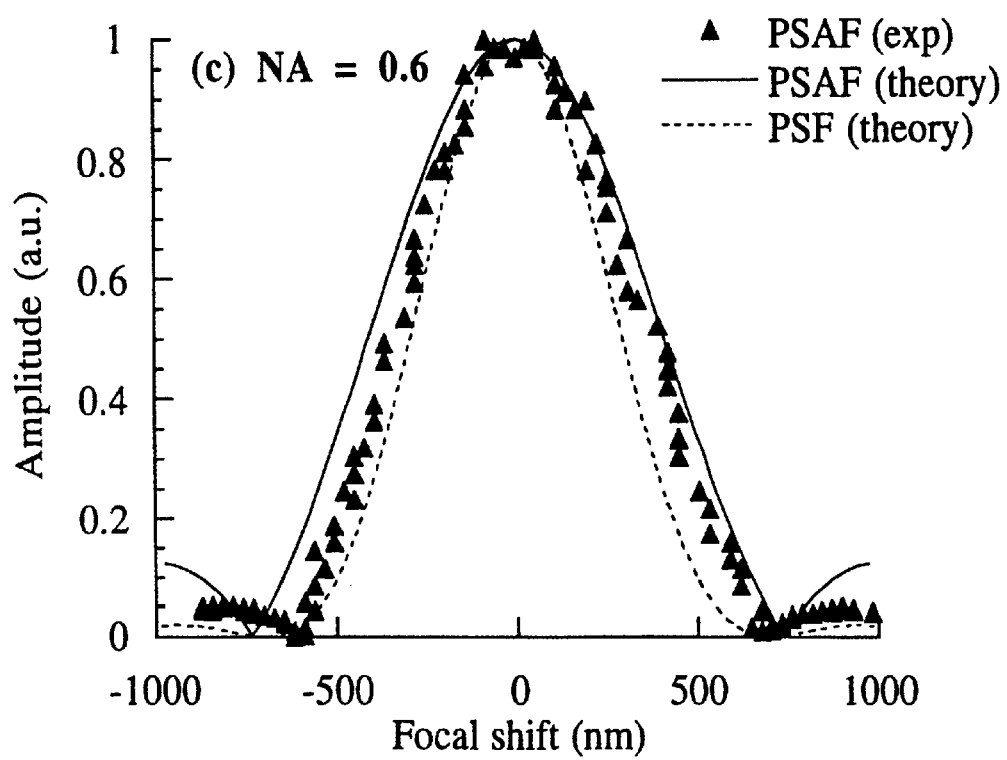

An example of the experimental and theoretical results, as obtained using this method, is shown in FIGS. 7 to 9. The experimental measurement points of the PSAF for three different numerical apertures (NAs) of a well corrected microscope objective are shown by the triangles in FIGS. 7 to 9. The PSAF is then calculated theoretically for each numerical aperture. These curves, the continuous lines in the said figures, are calculated without fitting parameters, that is to say without adjusting certain parameters in the theoretical calculation such that optimum correspondence with the experiment would be achieved. For comparison, the theoretically calculated PSF is also shown in the figures by a broken line. The excellent correspondence between experiment and theory, in particular in view of the lack of fitting parameters in the theoretical simulation of the experiment, indicates the possibilities which this technique offers for the determination of the PSAF and for the qualitative and quantitative measurement of: (i) the characteristics of an optical focusing element, such as: resolving power, first and higher order lens aberrations; and—in combination with theoretical models—(ii) the analysis of phase aberrations induced by the optical system or, for example, by the (varying) refractive index of the solvent. The PSAF is thus a new function for the characterisation of an optical focusing element, in a manner comparable to, and related to, the PSF.

The preferred embodiment described above can be modified and expanded in a variety of ways. In this context it is possible, for example, to consider the use of a combination of electromagnetic beams, for example of different wavelengths, which each pass through their own, or a partially combined, combination of beam splitters and delay lines before they are focused in the sample. An embodiment of this type can be used for the determination of spectral characteristics either of the optical focusing element or of an object to be imaged in the sample.

The quality of three-dimensional images obtained, for example, using confocal microscopy, can be appreciably improved with the aid of image restoration techniques [H. T. M.v.d. Voort and K. C. Strasters. *Restoration of confocal images for quantitative image analysis*. J. Microsc., 178(2), pp. 165–181 (1995)]. These techniques demand accurate knowledge of the PSF of the imaging system. The method as described in this invention is capable of generating the data, from which said PSF can be derived, at very high speed ("real time"). Moreover, the measurements can be carried out under conditions which are virtually identical to those under which the imaging comes about, as far as the illumination wavelength, the fluorescent substance, the emission wavelength, the refractive index of the medium and even the depth in the sample at which imaging takes place are concerned.

For pattern recognition it is important to be able to detect with high accuracy small amplitude and phase changes over the profile of one or more electromagnetic beams which illuminate the object. This applies for modes in which the electromagnetic beams pass through the object, for modes in which the electromagnetic beams are reflected by the object and for modes in which the electromagnetic beams are converted by the object into, for example, fluorescence. The method as described in this invention offers the possibility of determining the amplitude, phase and/or polarisation at any point in an electromagnetic beam, or at the focus thereof, in "real time", with high accuracy and in a simple and stable construction.

The method as described in this invention can also be used as an imaging technique, as already stated with reference to FIG. 6. By applying suitable shifts of the focal object field relative to the focal reference field in both space and time, it is possible to apply a specific and controllable excitation or illumination profile in terms of amplitude, phase and polarisation in the sample. A similar method can be used in detection by imaging the physical response in a specific manner on one or more detectors. Analysis of the data from the measurement of the physical response of the system for various such illumination and/or detection profiles can then be used to generate an image of an object in the sample. The imaging can be effected directly or can be effected after suitable processing of the data with the aid of analogue, digital or other methods. In this context, use can be made of various illumination modes, such as, for example, point mode, cursor mode, etc., for the illumination. Furthermore, use can be made of adjustments to the wave fronts in both illumination and detection by means of, for example, amplitude and phase filters, or holographic systems. The physical response of the system can also be influenced by making changes in the population and coherence distribution over the various energy levels of the molecules in the sample, by making use of additional electromagnetic beams. Each of these different embodiments, optionally in combination with suitable deconvolution techniques, can lead to higher resolution in the imaging in both the lateral and the axial directions.

By means of suitable abstraction of the basic principle of the invention it is possible optically to realise complex mathematical processes. A mathematical function can then be presented, in abstract form, by a specific distribution of amplitude, phase and polarisation at the focus of the optical focusing element. Thus, different functions can be represented by making use of different electromagnetic (partial) beams. The physical process in the sample represents the mathematical (complex) product, whilst the detection represents a specific or non-specific integration in one or more dimensions. By implementation of such abstractions, it is possible, with the aid of the methods as described in the invention, to realise, at very high speed, complex multi-dimensional integrations of mathematical representations, on which specific operations have been carried out. The choice of sample (homogeneous, random or structured) and the physical (interaction) process in the sample (scattering, single photon absorption, multi-photon absorption, etc.) codetermine the mathematical operations which can be carried out on the representations prior to the integrations.

Although the present invention has been described in terms of a few preferred embodiments, it will be clear to those skilled in the art that variations and modifications are possible without adversely affecting the essence of the invention, and the scope thereof, as indicated in the following claims.

I claim:

1. Method for imaging and characterization of the focal field of an optical focusing element by realizing an autocorrelation, at least in space, of the part focal fields of at least two electromagnetic part beams at the focus of the optical focusing element, comprising the steps of generation of a specific at least spatial distribution in amplitude, phase or polarization of the focal field, combined from said part focal fields, at said focus, placing a sample at said focus in which a physical response is generated related to at least one from the group of amplitude, phase and polarization of said focal field, and measurement of said physical response in at least one detector beyond said focus.

2. Method according to claim 1, wherein at least one one- or multi-dimensional spatial shift is introduced in the focal field of at least one of the at least two electromagnetic beams relative to the focal field of others of the at least two electromagnetic beams.

3. Method according to claim 1, wherein the relative phase of the at least two electromagnetic beams is controlled by introduction of a variable optical path length for at least one of the at least two electromagnetic beams.

4. Method according to claim 3, wherein the optical path length is varied periodically.

5. Method according to claim 1, wherein the physical response as a consequence of a physical process in the sample, which converts the local complex value of the combined focal field into a local real physical quantity, is detected.

6. Method according to claim 1, wherein the physical response as a consequence of scattering of the combined focal field at the sample is detected.

7. Method according to claim 5, wherein the physical response is detected with the aid of a specific collection function by making use of direct imaging on one detector, or combined imaging on various detectors, of a specific space/time distribution of the physical response at the focus of the optical focusing element which response is to be measured.

8. Method according to claim 7, for the correlation, at least in space, of the physical response, comprising the steps of splitting of the physical response into at least two part responses, introduction of at least one one- or multi-dimensional shift in one of the part responses relative to the others, and combining of the part responses.

9. Method according to claim 8, wherein the relative phase of the at least two part responses is controlled.

10. Method according to claim 7, wherein the specific collection function is combined with various apodisation conditions.

11. Method according to claim 1, wherein the quantitative structure in space and time, which is related to the point spread function, of the combined focal field of the focusing element is determined on and off the optical axis thereof, at least in one of the group comprising amplitude, phase and polarisation.

12. Method according to claim 1, wherein the wave front, with aberrations present therein induced in the aperture of the focusing element and/or at the focus thereof by the focusing element, by the sample or by external factors, of the at least one electromagnetic beam is determined.

13. Method according to claim 1, wherein at least one specific space/time distribution of at least one of the group comprising amplitude, phase and polarisation is applied in the combined focal field and is combined with at least one specific collection function for the purposes of an improved one- or multi-dimensional resolution and sectioning of an object to be imaged.

14. System for carrying out the method for imaging and characterization of the focal field of an optical focusing element according to claim 1, provided with at least one electromagnetic source for generating at least one electromagnetic beam, a mechanism for splitting the at least one electromagnetic beam into at least two part beams and for combining said two part beams, an optical focusing element for focusing the part beams, a mechanism for introducing at least one relative one- or multi-dimensional spatial shift at the focus of at least one of the part beams with respect to the foci of the other part beams, and at least one detector, characterized in that a sample is placed beyond the optical focusing element such that the focus of the part beams is formed therein and the combined focal field generates a physical response therein related to at least one from the group comprising amplitude, phase and polarization of said focal field, and in that the at least one detector for measurement of the physical response is positioned outside said focus.

15. System according to claim 14, additionally provided with at least one mechanism for introducing a variable optical path length for at least one of the part beams.

16. System according to claim 15, wherein the mechanism for introducing a variable optical path length is subjected to a periodic movement variation.

17. System for realizing an autocorrelation, at least in space, of the focal fields of at least two electromagnetic part beams derived from a single electromagnetic beam, comprising one and another mirror positioned opposite and parallel to one another and a splitting and combining mechanism which is arranged essentially parallel between said mirrors and is variably movable in a direction transverse to the parallel direction, whereby the incoming single electromagnetic beam is split by said mechanism in one and another part beam which respectively are reflected by the one and the other mirror and subsequently combined by said mechanism, the combined two part beams being directed via an optical focusing element such that an autocorrelation is realized, at least in space, of the focal fields of the two part beams, at the focus of the optical focusing element.

18. System according to claim 17, wherein the splitting and combining mechanism is subjected to a periodic movement variation.

19. System according to claim 17, wherein each mirror has a specific curvature and a mechanism for at least a two-dimensional rotation (FIG. 5).

20. System according to claim 19, additionally provided with elements for (inter)active changing of the shape of the mirrors.

21. System according to claim 14, wherein at least one annulus of variable radius and opening is placed in the aperture of the focusing element.

22. System according to claim 14, provided with elements for (inter)active correction of at least one of the wave fronts of the at least one electromagnetic beam.

23. System according to claim 14, additionally provided with apertures of different shape for modifying wave fronts of the electromagnetic beams.

24. System according to claim 23, additionally provided with amplitude and phase filters over at least one of the apertures.

25. System according to claim 14, additionally provided with other electromagnetic sources for inducing changes in the population and/or coherence state of molecules in the sample.

26. Method according to claim 11, employed for pattern recognition.

27. Method according to claim 1, and making use of a system according to claim 23 or 25, employed for (microscopic) imaging.

28. Method according to claim 1, wherein the images obtained are used for further one- or multi-dimensional data processing, rendering and/or reconstruction and/or restoration of said images.

29. Method according to claim 1, for optimisation of an optical focusing element.

30. Method according to claim 1, and making use of a system according to claim 25, for applying a specific space/time distribution of at least one of the group comprising amplitude, phase and polarisation at the focus of the optical focusing element, in order to realise an optical representation of a mathematical function.

31. Method according to claim 30, wherein a one- or multi-dimensional integral of at least two mathematical functions, subjected to mathematical operations, co-determined by the structure of the sample and the physical process, is carried out by detection of the physical response.

* * * * *